(12) United States Patent
Saito et al.

(10) Patent No.: US 10,590,026 B2
(45) Date of Patent: Mar. 17, 2020

(54) NON-ALKALI GLASS SUBSTRATE

(71) Applicant: Nippon Electric Glass Co., Ltd., Shiga (JP)

(72) Inventors: Atsuki Saito, Shiga (JP); Tetsuya Murata, Shiga (JP)

(73) Assignee: NIPPON ELECTRIC GLASS CO., LTD., Shiga (JP)

(*) Notice: Subject to any disclaimer, the term of this patent is extended or adjusted under 35 U.S.C. 154(b) by 0 days.

(21) Appl. No.: 15/574,267

(22) PCT Filed: May 11, 2016

(86) PCT No.: PCT/JP2016/064035
§ 371 (c)(1),
(2) Date: Nov. 15, 2017

(87) PCT Pub. No.: WO2016/185976
PCT Pub. Date: Nov. 24, 2016

(65) Prior Publication Data
US 2018/0141849 A1 May 24, 2018

(30) Foreign Application Priority Data

May 18, 2015 (JP) ................. 2015-100754

(51) Int. Cl.
| | | |
|---|---|---|
| *C03C 3/085* | (2006.01) | |
| *C03C 3/091* | (2006.01) | |
| *C03B 5/027* | (2006.01) | |
| *C03C 3/087* | (2006.01) | |
| *G09F 9/30* | (2006.01) | |
| *C03B 17/06* | (2006.01) | |
| *C03C 3/11* | (2006.01) | |
| *C03B 5/43* | (2006.01) | |

(52) U.S. Cl.
CPC ............ *C03C 3/091* (2013.01); *C03B 5/027* (2013.01); *C03B 5/43* (2013.01); *C03B 17/06* (2013.01); *C03B 17/064* (2013.01); *C03C 3/087* (2013.01); *C03C 3/11* (2013.01); *G09F 9/30* (2013.01); *G09F 9/301* (2013.01); *Y02P 40/57* (2015.11)

(58) Field of Classification Search
CPC ..................................................... C03C 3/087
See application file for complete search history.

(56) References Cited

U.S. PATENT DOCUMENTS

| | | | |
|---|---|---|---|
| 9,162,919 B2 * | 10/2015 | Ellison | ............. C03C 3/093 |
| 9,604,870 B2 * | 3/2017 | Ellison | ............. C03C 3/093 |
| 2013/0029830 A1 | 1/2013 | Koyama et al. | |
| 2013/0225390 A1 * | 8/2013 | Ellison | ............. C03C 3/093 |
| | | | 501/66 |
| 2014/0249019 A1 | 9/2014 | Koyama et al. | |
| 2014/0366581 A1 * | 12/2014 | Tokunaga | ............. C03C 3/087 |
| | | | 65/135.7 |
| 2016/0039708 A1 * | 2/2016 | Ellison | ............. C03C 3/093 |
| | | | 501/66 |

FOREIGN PATENT DOCUMENTS

| | | |
|---|---|---|
| WO | 2013/005679 | 1/2013 |
| WO | 2013/129368 | 9/2013 |
| WO | 2015/056645 | 4/2015 |

OTHER PUBLICATIONS

WO 2015056645, machine translation. (Apr. 2015).*
Machine translation of WO 2015056645 (Year: 2015).*
International Search Report dated Jul. 19, 2017 in International (PCT) Application No. PCT/JP2016/064035.

* cited by examiner

*Primary Examiner* — Karl E Group
(74) *Attorney, Agent, or Firm* — Wenderoth, Lind & Ponack, L.L.P.

(57) ABSTRACT

A technical object of the present invention is to devise an alkali-free glass substrate having high devitrification resistance and high heat resistance. In order to achieve the above-mentioned technical object, the alkali-free glass substrate of the present invention includes as a glass composition, in terms of mol %, 60% to 80% of $SiO_2$, 8% to 25% of $Al_2O_3$, 0% to less than 3% of $B_2O_3$, 0% to less than 1% of $Li_2O+Na_2O+K_2O$, 0% to 10% of MgO, 1% to 15% of CaO, 0% to 12% of SrO, 0% to 12% of BaO, 0% to less than 0.05% of $As_2O_3$, and 0% to less than 0.05% of $Sb_2O_3$, and has a thickness of from 0.05 mm to 0.7 mm, a strain point of 700° C. or more, and a β-OH value of less than 0.20/mm.

10 Claims, No Drawings

NON-ALKALI GLASS SUBSTRATE

TECHNICAL FIELD

The present invention relates to an alkali-free glass substrate, and more specifically, to an alkali-free glass substrate suitable as a glass substrate for a flat panel display, such as a liquid crystal display or an OLED display.

BACKGROUND ART

An OLED device, such as an OLED display, is used in applications such as displays of cellular phones because the OLED device is thin, is excellent in displaying a moving image, and has low power consumption.

A glass substrate is widely used as a substrate of an OLED display. Glass substantially free of an alkali metal oxide, that is, alkali-free glass is used for the glass substrate of this application. When the alkali-free glass is used, a situation in which an alkali ion is diffused in a heat treatment step into a semiconductor substance having been formed into a film can be prevented.

SUMMARY OF INVENTION

Technical Problem

For example, the alkali-free glass substrate of this application is required to satisfy the following demand characteristics (1) and (2).
(1) To less devitrify during forming, that is, have high devitrification resistance in order to increase productivity of a thin glass substrate.
(2) To have high heat resistance in order to reduce thermal shrinkage of the glass substrate in a production process for, for example, a p-Si TFT, particularly a high temperature p-Si TFT.

However, it is not easy to balance the demand characteristics (1) and (2). Specifically, when the heat resistance of the alkali-free glass is to be increased, the devitrification resistance is liable to be reduced. In contrast, when the devitrification resistance of the alkali-free glass is to be increased, the heat resistance is liable to be reduced.

The present invention has been made in view of the above-mentioned circumstances, and a technical object of the present invention is to devise an alkali-free glass substrate having high devitrification resistance and high heat resistance.

Solution to Problem

The inventors of the present invention have repeatedly performed various experiments. As a result, the inventors have found that the technical object can be achieved by restricting a glass composition within a predetermined range and reducing a water content in glass. Thus, the inventors propose the finding as the present invention. That is, an alkali-free glass substrate according to one embodiment of the present invention comprises as a glass composition, in terms of mol %, 60% to 80% of $SiO_2$, 8% to 25% of $Al_2O_3$, 0% to less than 3% of $B_2O_3$, 0% to less than 1% of $Li_2O+Na_2O+K_2O$, 0% to 10% of MgO, 1% to 15% of CaO, 0% to 12% of SrO, 0% to 12% of BaO, 0% to less than 0.05% of $As_2O_3$, and 0% to less than 0.05% of $Sb_2O_3$, and has a thickness of from 0.05 mm to 0.7 mm, a strain point of 700° C. or more, and a β-OH value of less than 0.20/mm. Herein, the content of "$Li_2O+Na_2O+K_2O$" refers to the total content of $Li_2O$, $Na_2O$, and $K_2O$. The "strain point" refers to a value measured in accordance with ASTM C336. The "β-OH value" refers to a value calculated from the following equation 1 based on transmittances measured with an FT-IR.

$$\beta\text{-OH value} = (1/X)\log(T_1/T_2)$$

X: Thickness (mm)
$T_1$: Transmittance (%) at a reference wavelength of 3,846 $cm^{-1}$
$T_2$: Minimum transmittance (%) at a wavelength around a hydroxyl group absorption wavelength of 3,600 $cm^{-1}$ In the alkali-free glass substrate according to the embodiment of the present invention, the content of $B_2O_3$ is restricted to less than 3 mol % and the content of $Li_2O+Na_2O+K_2O$ is restricted to less than 1 mol % in the glass composition, and the β-OH value is restricted to less than 0.20/mm. With this, a strain point is remarkably increased, and the heat resistance of the glass substrate can be significantly increased. As a result, thermal shrinkage of the glass substrate can be significantly reduced in a production process for, for example, a p-Si TFT, particularly a high temperature p-Si TFT.

Further, the alkali-free glass substrate according to the embodiment of the present invention comprises 60 mol % to 80 mol % of $SiO_2$, 8 mol % to 25 mol % of $Al_2O_3$, and 1 mol % to 15 mol % of CaO in the glass composition. With this, devitrification resistance can be increased. As a result, the glass substrate is easily formed thin by an overflow down-draw method or the like.

Secondly, it is preferred that the alkali-free glass substrate according to the embodiment of the present invention comprise as a glass composition, in terms of mol %, 65% to 78% of $SiO_2$, 8% to 20% of $Al_2O_3$, 0% to less than 1% of $B_2O_3$, 0% to less than 0.5% of $Li_2O+Na_2O+K_2O$, 0% to 8% of MgO, 1% to 8% of CaO, 0% to 8% of SrO, 1% to 8% of BaO, 0% to less than 0.01% of $As_2O_3$, and 0% to less than 0.01% of $Sb_2O_3$, and have a thickness of from 0.1 mm to 0.5 mm, a strain point of 730° C. or more, and a β-OH value of less than 0.15/mm.

Thirdly, it is preferred that the alkali-free glass substrate according to the embodiment of the present invention have a content of $B_2O_3$ of less than 0.1 mol %.

Fourthly, it is preferred that the alkali-free glass substrate according to the embodiment of the present invention have a content of $B_2O_3$ of from 0.1 mol % to less than 1 mol %.

Fifthly, it is preferred that the alkali-free glass substrate according to the embodiment of the present invention further comprise as a glass composition 0.001 mol % to 1 mol % of $SnO_2$.

Sixthly, it is preferred that the alkali-free glass substrate according to the embodiment of the present invention further comprise as a glass composition 0.001 mol % to 1 mol % of Cl and 0.0001 mol % to 1 mol % of $SO_3$.

Seventhly, it is preferred that the alkali-free glass substrate according to the embodiment of the present invention have a liquidus temperature of 1,300° C. or less. Herein, the "liquidus temperature" refers to a temperature at which devitrification (devitrified crystal) is observed in glass when glass powder which has passed through a standard 30-mesh sieve (500 μm) and remained on a 50-mesh sieve (300 μm) is placed in a platinum boat and kept for 24 hours in a gradient heating furnace, followed by taking the platinum boat out of the gradient heating furnace.

Eighthly, it is preferred that the alkali-free glass substrate according to the embodiment of the present invention have a temperature at a viscosity of $10^{2.5}$ dPa·s of 1,750° C. or less. Herein, the "temperature at a viscosity of $10^{2.5}$ dPa·s" may be measured by a platinum sphere pull up method.

Ninthly, it is preferred that the alkali-free glass substrate according to the embodiment of the present invention have a thermal shrinkage value of 20 ppm or less when a temperature of the alkali-free glass substrate is increased from normal temperature up to 500° C. at a temperature increase rate of 5° C./min, kept at 500° C. for 1 hour, and then cooled down to normal temperature at a temperature decrease rate of 5° C./min.

Tenthly, it is preferred that the alkali-free glass substrate according to the embodiment of the present invention be used for a substrate of an OLED device.

Eleventhly, a method of producing an alkali-free glass substrate according to one embodiment of the present invention comprises: a melting step of heating a blended glass batch through application of a current with a heating electrode without heating with combustion burner flame so as to provide alkali-free glass comprising as a glass composition, in terms of mol %, 60% to 80% of $SiO_2$, 8% to 25% of $Al_2O_3$, 0% to less than 3% of $B_2O_3$, 0% to less than 1% of $Li_2O+Na_2O+K_2O$, 0% to 10% of MgO, 1% to 15% of CaO, 0% to 12% of SrO, 0% to 12% of BaO, 0% to less than 0.05% of $As_2O_3$, and 0% to less than 0.05% of $Sb_2O_3$, and having a strain point of 700° C. or more and a β-OH value of less than 0.20/mm, to thereby provide molten glass; and a forming step of forming the resultant molten glass into a flat sheet shape having a thickness of from 0.1 mm to 0.7 mm by an overflow down-draw method. Herein, the "overflow down-draw method" refers to a method in which molten glass is caused to overflow from both sides of a heat-resistant, trough-shaped structure, and the overflowing molten glasses are subjected to down-draw downward at the lower end of the trough-shaped structure while being joined, to thereby produce a glass substrate.

DESCRIPTION OF EMBODIMENTS

An alkali-free glass substrate of the present invention comprises as a glass composition, in terms of mol %, 60% to 80% of $SiO_2$, 8% to 25% of $Al_2O_3$, 0% to less than 3% of $B_2O_3$, 0% to less than 1% of $Li_2O+Na_2O+K_2O$, 0% to 10% of MgO, 1% to 15% of CaO, 0% to 12% of SrO, 0% to 12% of BaO, 0% to less than 0.05% of $As_2O_3$, and 0% to less than 0.05% of $Sb_2O_3$. The reasons why the contents of the components are limited as described above are hereinafter described. The expression "%" represents "mol %" in the descriptions of the contents of the components.

The lower limit of the content range of $SiO_2$ is preferably 60% or more, 65% or more, 67% or more, 69% or more, 70% or more, or 71% or more, particularly preferably 72% or more, and the upper limit of the content range of $SiO_2$ is preferably 80% or less, 78% or less, 76% or less, 75% or less, or 74% or less, particularly preferably 73% or less. When the content of $SiO_2$ is too small, a devitrified crystal containing $Al_2O_3$ is liable to be generated, and in addition, a strain point is liable to lower. Meanwhile, when the content of $SiO_2$ is too large, a viscosity at high temperature increases, and thus meltability is liable to lower. In addition, a devitrified crystal, such as cristobalite, precipitates, and a liquidus temperature is liable to increase.

The lower limit of the content range of $Al_2O_3$ is preferably 8% or more, 9% or more, 9.5% or more, or 10% or more, particularly preferably 10.5% or more, and the upper limit of the content range of $Al_2O_3$ is preferably 25% or less, 20% or less, 15% or less, 14% or less, 13% or less, or 12% or less, particularly preferably 11.5% or less. When the content of $Al_2O_3$ is too small, the strain point is liable to lower, and in addition, glass is liable undergo phase separation. Meanwhile, when the content of $Al_2O_3$ is too large, the devitrified crystal, such as mullite or anorthite, precipitates, and the liquidus temperature is liable to increase.

When the content of $B_2O_3$ is too large, the strain point significantly lowers. Therefore, the content of $B_2O_3$ is less than 3%, preferably 1.5% or less, 1% or less, less than 1%, 0.7% or less, or 0.5% or less, particularly preferably less than 0.1%. Meanwhile, when $B_2O_3$ is introduced in a small amount, crack resistance is improved, and the meltability and devitrification resistance are increased. Therefore, when $B_2O_3$ is introduced in a small amount, the content of $B_2O_3$ is preferably 0.01% or more, 0.1% or more, 0.2% or more, or 0.3% or more, particularly preferably 0.4% or more.

As described above, $Li_2O$, $Na_2O$, and $K_2O$ are each a component which deteriorates the characteristics of a semiconductor film. Therefore, the total content of $Li_2O$, $Na_2O$, and $K_2O$ and the content of each of $Li_2O$, $Na_2O$, and $K_2O$ are preferably less than 1%, less than 0.5%, less than 0.2%, or less than 0.1%, particularly preferably less than 0.06%. Meanwhile, when $Li_2O$, $Na_2O$, and $K_2O$ are introduced in a small amount, the glass is easily melted by heating through application of a current with a heating electrode because of a reduction in electrical resistivity of molten glass. Therefore, the total content of $Li_2O$, $Na_2O$, and $K_2O$ and the content of each of $Li_2O$, $Na_2O$, and $K_2O$ are preferably 0.01% or more, 0.02% or more, 0.03% or more, or 0.04% or more, particularly preferably 0.05% or more.

MgO is a component which lowers the viscosity at high temperature and thus increases the meltability. The content of MgO is preferably from 0% to 10%, from 0% to 8%, from 0% to 5%, from 0% to 4%, from 0.01% to 3.5%, from 0.1% to 3.2%, or from 0.5% to 3%, particularly preferably from 1% to 2.7%. When the content of MgO is too large, the strain point is liable to lower.

From the viewpoint of increasing the strain point, the content of $B_2O_3$+MgO (the total content of $B_2O_3$ and MgO) is preferably 6% or less, from 0.1% to 5%, or from 1% to 4.5%, particularly preferably from 2% to 4%. When the content of $B_2O_3$+MgO is too small, the meltability, the crack resistance, and chemical resistance are liable to lower.

The molar ratio $B_2O_3$/MgO is preferably 0.3 or less, 0.25 or less, 0.22 or less, from 0.01 to 0.2, or from 0.05 to 0.18, particularly preferably from 0.1 to 0.17. With this, the devitrification resistance is easily controlled within an appropriate range.

CaO is a component which lowers the viscosity at high temperature and thus remarkably increases the meltability without lowering the strain point. In addition, a raw material for introducing CaO is relatively inexpensive among those for alkaline earth metal oxides, and hence CaO is a component which achieves a reduction in raw material cost. The content of CaO is preferably from 1% to 15%, from 3% to 10%, from 4% to 9%, or from 4.5% to 8%, particularly preferably from 5% to 7%. When the content of CaO is too small, it becomes difficult to exhibit the above-mentioned effects. Meanwhile, when the content of CaO is too large, a thermal expansion coefficient excessively increases, and in addition, the balance of the components in the glass composition is impaired, and the glass is liable to devitrify.

SrO is a component which increases the devitrification resistance, and is also a component which lowers the viscosity at high temperature and thus increases the meltability without lowering the strain point. The content of SrO is preferably from 0% to 12%, from 0% to 8%, from 0.1% to 6%, from 0.5% to 5%, or from 0.8% to 4%, particularly preferably from 1% to 3%. When the content of SrO is too small, it becomes difficult to exhibit an effect of suppressing phase separation or an effect of increasing the devitrification resistance. Meanwhile, when the content of SrO is too large, the balance of the components in the glass composition is impaired, and a strontium silicate-based devitrified crystal is liable to precipitate.

BaO is a component which remarkably increases the devitrification resistance among the alkaline earth metal oxides. The content of BaO is preferably from 0% to 12%, from 0.1% to 10%, from 1% to 8%, from 2% to 7%, from 3% to 6%, or from 3.5 to 5.5%, particularly preferably from 4% to 5%. When the content of BaO is too small, the liquidus temperature increases, and thus the devitrification resistance is liable to lower. Meanwhile, when the content of BaO is too large, the balance of the components in the glass composition is impaired, and a devitrified crystal containing BaO is liable to precipitate.

The content of RO (the total content of MgO, CaO, SrO, and BaO) is preferably from 12% to 180, from 13% to 17.50, from 13.5% to 17%, particularly preferably from 14% to 16.80. When the content of RO is too small, the meltability is liable to lower. Meanwhile, when the content of RO is too large, the balance of the components in the glass composition is impaired, and the devitrification resistance is liable to lower.

The molar ratio CaO/RO is preferably 0.8 or less, 0.7 or less, from 0.1 to 0.7, from 0.2 to 0.65, or from 0.3 to 0.6, particularly preferably from 0.45 to 0.55. With this, the devitrification resistance and the meltability are easily optimized.

The molar ratio BaO/RO is preferably 0.5 or less, 0.4 or less, from 0.1 to 0.37 or less, from 0.2 to 0.35, or from 0.24 to 0.32, particularly preferably from 0.27 to 0.3. With this, the devitrification resistance is easily increased while the meltability is increased.

$As_2O_3$ and $Sb_2O_3$ are each a component which causes the glass to be colored when the glass is melted by heating through application of a current with a heating electrode without heating with combustion burner flame. The content of each of $As_2O_3$ and $Sb_2O_3$ is preferably less than 0.05% or less than 0.01%, particularly preferably less than 0.005%.

Other than the above-mentioned components, for example, the following components may be added to the glass composition. From the viewpoint of exhibiting the effects of the present invention appropriately, the total content of the components other than the above-mentioned components is preferably 10% or less, particularly preferably 5% or less.

ZnO is a component which increases the meltability. However, when ZnO is contained in a large amount, the glass is liable to devitrify, and in addition, the strain point is liable to lower. The content of ZnO is preferably from 0% to 5%, from 0% to 3%, or from 0% to 0.5%, particularly preferably from 0% to 0.2%.

$P_2O_5$ is a component which increases the strain point without lowering the devitrification resistance. However, when $P_2O_5$ is contained in a large amount, the glass is liable to undergo phase separation. The content of $P_2O_5$ is preferably from 0% to 5%, from 0.05% to 3%, or from 0.1% to 1.8%, particularly preferably from 0.5% to 1.5%.

$TiO_2$ is a component which lowers the viscosity at high temperature and thus increases the meltability, and is also a component which suppresses solarisation. However, when $TiO_2$ is contained in a large amount, the glass is colored, and thus a transmittance is liable to lower. Therefore, the content of $TiO_2$ is preferably from 0% to 3%, from 0% to 1%, or from 0% to 0.1%, particularly preferably from 0% to 0.02%.

$Fe_2O_3$ is a component which causes the glass to be colored. Therefore, the content of $Fe_2O_3$ is preferably less than 1%, less than 0.5%, less than 0.2%, or less than 0.1%, particularly preferably less than 0.06%. Meanwhile, when $Fe_2O_3$ is introduced in a small amount, the glass is easily melted by heating through application of a current with a heating electrode because of a reduction in electrical resistivity of the molten glass. Therefore, the content of $Fe_2O_3$ is preferably 0.001% or more, 0.004% or more, 0.006% or more, or 0.008% or more, particularly preferably 0.01% or more.

$Y_2O_3$, $Nb_2O_5$, and $La_2O_3$ each have an action of increasing the strain point, a Young's modulus, and the like. However, when the contents of those components are too large, a density and the raw material cost are liable to increase. Therefore, the content of each of $Y_2O_3$, $Nb_2O_5$, and $La_2O_3$ is preferably from 0% to 3% or from 0% to 1%, particularly preferably from 0% to 0.1%.

Cl is a component which acts as a desiccant and thus reduces a β-OH value. Therefore, when Cl is introduced, the lower limit of the content of Cl is preferably 0.001% or more or 0.003% or more, particularly preferably 0.005% or more. However, when the content of Cl is too large, the strain point is liable to lower. Therefore, the upper limit of the content of Cl is preferably 0.5% or less, particularly preferably 0.1% or less. An alkaline earth metal chloride, such as strontium chloride, or aluminum chloride may be used as a raw material for introducing Cl.

$SO_3$ is a component which acts as a desiccant and thus reduces a β-OH value. Therefore, when $SO_3$ is introduced, the lower limit of the content of $SO_3$ is preferably 0.0001% or more or 0.001% or more, particularly preferably 0.002% or more. However, when the content of $SO_3$ is too large, reboil bubbles are liable to be generated. Therefore, the upper limit of the content of $SO_3$ is preferably 0.05% or less, particularly preferably 0.01% or less.

$SnO_2$ is a component which exhibits a satisfactory fining action in a high temperature region. In addition, $SnO_2$ is a component which increases the strain point, and is also a component which lowers the viscosity at high temperature. The content of $SnO_2$ is preferably from 0% to 1%, from 0.001% to 1%, or from 0.05% to 0.5%, particularly preferably from 0.1% to 0.3%. When the content of $SnO_2$ is too large, a devitrified crystal of $SnO_2$ is liable to precipitate. When the content of $SnO_2$ is less than 0.001%, it becomes difficult to exhibit the above-mentioned effects.

A fining agent other than $SnO_2$ may be used unless the characteristics of the glass are significantly impaired. Specifically, $CeO_2$, F, and C may be added up to, for example, 1% in terms of their total content. Metal powders, such as Al powder and Si powder, may be added up to, for example, 1% in terms of their total content.

The alkali-free glass substrate of the present invention preferably has the following characteristics.

The strain point is preferably 700° C. or more, 720° C. or more, 730° C. or more, 740° C. or more, 750° C. or more, particularly preferably 760° C. or more. With this, thermal shrinkage of the glass substrate can be reduced in a production process for a p-Si TFT.

The liquidus temperature is preferably 1,300° C. or less, 1,280° C. or less, 1,260° C. or less, 1,250° C. or less, particularly preferably 1,240° C. or less. With this, a situation in which a devitrified crystal is generated during forming to cause a reduction in productivity is easily prevented. Further, the forming of the glass substrate is easily performed by an overflow down-draw method, and hence the surface quality of the glass substrate can be increased. The liquidus temperature serves as an indicator of the devitrification resistance. A lower liquidus temperature indicates additionally excellent devitrification resistance.

A viscosity at the liquidus temperature is preferably $10^{4.8}$ poise or more, $10^{5.0}$ poise or more, or $10^{5.2}$ poise or more, particularly preferably $10^{5.3}$ poise or more. With this, a situation in which a devitrified crystal is generated during forming to cause a reduction in productivity is easily prevented. Further, the forming of the glass substrate is easily performed by an overflow down-draw method, and hence the surface quality of the glass substrate can be increased. The "viscosity at a liquidus temperature" may be measured by a platinum sphere pull up method.

A temperature at a viscosity of $10^{2.5}$ poise is preferably 1,750° C. or less, 1,720° C. or less, 1,700° C. or less, or 1,690° C. or less, particularly preferably 1,680° C. or less. When the temperature at a viscosity of $10^{2.5}$ poise becomes higher, it becomes difficult to ensure the meltability and a fining property, resulting in a rise in production cost of the glass substrate.

A reduction in β-OH value allows an increase in strain point without changing the glass composition. The β-OH value is preferably less than 0.20/mm, 0.18/mm or less, 0.15/mm or less, 0.13/mm or less, 0.12/mm or less, or 0.11/mm or less, particularly preferably 0.10/mm or less. When the β-OH value is too large, the strain point is liable to lower. When the β-OH value is too small, the meltability is liable to lower. Therefore, the β-OH value is preferably 0.01/mm or more, particularly preferably 0.05/mm or more.

A method of reducing the β-OH value is exemplified by the following methods: (1) a method involving selecting raw materials having low water contents; (2) a method involving adding a desiccant, such as Cl or $SO_3$, to a glass batch; (3) a method involving reducing the water content in a furnace atmosphere; (4) a method involving performing $N_2$ bubbling in the molten glass; (5) a method involving adopting a small melting furnace; (6) a method involving increasing the flow rate of the molten glass; and (7) a method involving heating through application of a current with a heating electrode.

Of those, a method of melting a blended glass batch by heating through application of a current with a heating electrode without heating with combustion burner flame is effective for restricting the β-OH value to less than 0.20/mm. When the desiccant, such as Cl or $SO_3$, is added to the glass batch in addition to adopting this method, a further reduction in β-OH value can be achieved.

The alkali-free glass substrate of the present invention has a thermal shrinkage value of preferably 20 ppm or less, 15 ppm or less, or 12 ppm or less, particularly preferably 10 ppm or less when a temperature of the alkali-free glass substrate is increased from normal temperature up to 500° C. at a temperature increase rate of 5° C./min, kept at 500° C. for 1 hour, and then cooled down to normal temperature at a temperature decrease rate of 5° C./min. When the thermal shrinkage value is too large, the yield of an OLED display is liable to lower. As a method of reducing the thermal shrinkage value, there are given, for example, a method involving reducing the temperature decrease rate of the glass substrate by elongating an annealing furnace to be connected to a forming furnace and a method involving off-line annealing the glass substrate, in addition to a method of increasing the strain point by reducing the β-OH value.

The alkali-free glass substrate of the present invention has a thickness of preferably from 0.05 mm to 0.7 mm or from 0.1 mm to 0.5 mm, particularly preferably from 0.2 mm to 0.4 mm. When the thickness is smaller, reductions in weight and thickness of a display are easily achieved. However, when the thickness is small, it is highly necessary to increase a forming speed (sheet-drawing speed). In this case, the thermal shrinkage rate of the glass substrate is liable to increase. In the present invention, such situation can effectively be prevented even when the forming speed (sheet-drawing speed) is high because of the low β-OH value and the high strain point.

The alkali-free glass substrate of the present invention is preferably obtained through forming by an overflow down-draw method. Through the forming by an overflow down-draw method, surfaces to serve as the surfaces of the glass substrate are formed in a state of free surfaces without being brought into contact with a trough-shaped refractory. As a result, a glass substrate having satisfactory surface quality can be produced at low cost without polishing. In addition, the overflow down-draw method also has the advantage of easy forming of a glass substrate having a small thickness and a large size.

A method of producing an alkali-free glass substrate of the present invention comprises: a melting step of heating a blended glass batch through application of a current with a heating electrode without heating with combustion burner flame so as to provide alkali-free glass comprising as a glass composition, in terms of mol %, 60% to 80% of $SiO_2$, 8% to 25% of $Al_2O_3$, 0% to less than 3% of $B_2O_3$, 0% to less than 1% of $Li_2O+Na_2O+K_2O$, 0% to 10% of MgO, 1% to 15% of CaO, 0% to 12% of SrO, 0% to 12% of BaO, 0% to less than 0.05% of $As_2O_3$, and 0% to less than 0.05% of $Sb_2O_3$, and having a strain point of 700° C. or more and a β-OH value of less than 0.20/mm, to thereby provide molten glass; and a forming step of forming the resultant molten glass into a flat sheet shape having a thickness of from 0.1 mm to 0.7 mm by an overflow down-draw method. Herein, part of the technical features of the method of producing an alkali-free glass substrate of the present invention has already been described in the section of the description of the alkali-free glass substrate of the present invention. Thus, the detailed description of the overlapping portions is omitted.

In general, a production process for the alkali-free glass substrate comprises a melting step, a fining step, a supplying step, a stirring step, and a forming step. The melting step is a step of melting a glass batch obtained by blending glass raw materials to provide molten glass. The fining step is a step of fining the molten glass obtained in the melting step by an action of a fining agent or the like. The supplying step is a step of transferring the molten glass from one step to another. The stirring step is a step of stirring the molten glass to homogenize the molten glass. The forming step is a step of forming the molten glass into a flat sheet shape. A step other than the above-mentioned steps, for example, a state adjusting step of adjusting the molten glass to be in a state suitable for forming may be introduced after the stirring step as required.

Alkali-free glass has hitherto been generally melted by heating with combustion burner flame. A burner is generally arranged at an upper portion of a melting kiln, and uses fossil fuel as its fuel, specifically, for example, liquid fuel, such as heavy oil, or gas fuel, such as LPG. The combustion flame may be obtained by mixing the fossil fuel and oxygen gas. However, such method is liable to entail an increase in β-OH value because a large amount of water is mixed in the molten glass during melting. Therefore, the method of producing an alkali-free glass substrate of the present invention comprises performing heating through application of a current with a heating electrode without heating with combustion burner flame. With this, water is less liable to be mixed in the molten glass during melting, and hence the β-OH value is easily controlled to less than 0.20/mm. Further, when the heating through application of a current with a heating electrode is performed without heating with combustion burner flame, the amount of energy required for obtaining the molten glass per unit mass is reduced, and the amount of a melt volatile is reduced. As a result, an environmental load can be reduced.

The heating through application of a current with a heating electrode is preferably performed by applying an alternating voltage to a heating electrode arranged at a bottom portion or a side portion of a melting kiln so as to be brought into contact with the molten glass in the melting kiln. A material used for the heating electrode preferably has heat resistance and corrosion resistance to the molten glass. For example, tin oxide, molybdenum, platinum, or rhodium may be used, and from the viewpoint of heat resistance, molybdenum is preferred.

The alkali-free glass, which is free from an alkali metal oxide, has high electrical resistivity. Therefore, when the heating through application of a current with a heating electrode is applied to the alkali-free glass, there is a risk in that the current flows not only in the molten glass but also in a refractory constituting the melting kiln, with the result that the refractory constituting the melting kiln is damaged early. In order to prevent such situation, it is preferred to use, as a refractory in a furnace, a zirconia-based refractory having high electrical resistivity, particularly zirconia electrocast bricks. It is also preferred to introduce a component which lowers the electrical resistivity ($Li_2O$, $Na_2O$, $K_2O$, $Fe_2O_3$, or the like) in the molten glass in a small amount. The content of $ZrO_2$ in the zirconia-based refractory is preferably 85 mass % or more, particularly preferably 90 mass % or more.

EXAMPLES

The present invention is hereinafter described by way of Examples. However, Examples below are merely examples, and the present invention is by no means limited to Examples below.

Examples (Sample Nos. 1 to 14 and 17 to 22) and Comparative Examples (Sample Nos. 15 and 16) of the present invention are shown in Tables 1 and 2.

TABLE 1

| | | No. 1 | No. 2 | No. 3 | No. 4 | No. 5 | No. 6 | No. 7 | No. 8 | No. 9 | No. 10 | No. 11 | No. 12 | No. 13 | No. 14 | No. 15 | No. 16 |
|---|---|---|---|---|---|---|---|---|---|---|---|---|---|---|---|---|---|
| Glass composition [mol %] | $SiO_2$ | 72.9 | 73.0 | 72.9 | 72.4 | 72.1 | 71.3 | 72.4 | 72.5 | 72.4 | 72.9 | 73.7 | 73.2 | 72.7 | 73.7 | 67.2 | 71.3 |
| | $Al_2O_3$ | 10.9 | 10.7 | 10.8 | 11.5 | 11.4 | 11.8 | 11.1 | 10.7 | 10.7 | 10.8 | 10.9 | 10.9 | 10.8 | 10.8 | 12.5 | 11.8 |
| | $B_2O_3$ | 0.01 | 0.0 | 0.5 | 0.5 | 1.0 | 1.0 | 0.5 | 0.01 | 0.0 | 0.01 | 0.01 | 0.01 | 0.01 | 0.0 | 4.7 | 1.0 |
| | $Na_2O$ | 0.00 | 0.01 | 0.01 | 0.01 | 0.00 | 0.01 | 0.00 | 0.00 | 0.00 | 0.00 | 0.00 | 0.00 | 0.00 | 0.00 | 0.17 | 0.00 |
| | $K_2O$ | 3.4 | 3.4 | 1.7 | 1.6 | 2.6 | 2.7 | 1.8 | 3.4 | 1.8 | 3.3 | 1.7 | 3.5 | 0.1 | 0.0 | 6.8 | 2.6 |
| | MgO | 4.2 | 9.0 | 7.8 | 8.0 | 7.3 | 7.3 | 7.8 | 6.6 | 9.0 | 5.5 | 5.4 | 4.2 | 10.2 | 8.0 | 1.8 | 7.3 |
| | CaO | 5.3 | 0.0 | 1.7 | 1.3 | 1.1 | 1.3 | 1.7 | 2.5 | 2.0 | 3.3 | 4.0 | 4.0 | 2.0 | 3.4 | 6.8 | 1.4 |
| | SrO | 3.2 | 4.9 | 4.5 | 4.5 | 4.4 | 4.4 | 4.5 | 4.2 | 4.0 | 4.1 | 4.1 | 4.1 | 4.1 | 4.1 | 0.0 | 4.4 |
| | BaO | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| | $P_2O_5$ | 0.01 | 0.01 | 0.01 | 0.01 | 0.01 | 0.01 | 0.0 | 0.01 | 0.01 | 0.01 | 0.01 | 0.01 | 0.01 | 0.00 | 0.00 | 0.00 |
| | $Fe_2O_3$ | 0.14 | 0.14 | 0.14 | 0.14 | 0.14 | 0.14 | 0.0 | 0.14 | 0.14 | 0.14 | 0.14 | 0.14 | 0.14 | 0.14 | 0.09 | 0.14 |
| | $SnO_2$ | 0.0 | 0.0 | 0.0 | 0.0 | 0.0 | 0.0 | 0.0 | 0.0 | 0.0 | 0.0 | 0.0 | 0.0 | 0.0 | 0.0 | 0.1 | 0.0 |
| | $SO_3$ | 0.1 | 0.1 | 0.1 | 0.1 | 0.1 | 0.1 | 0.0 | 0.1 | 0.1 | 0.1 | 0.1 | 0.1 | 0.1 | 0.1 | 0.0 | 0.1 |
| | Cl | | | | | | | | | | | | | | | | |
| Heating method | | Current application | Current application | Current application | Current application | Current application | Current application | Current application | Current application | Current application | Current application | Current application | Current application | Current application | Current application | Current application | Combustion on flame Current application |
| Thickness [mm] | | 0.40 | 0.40 | 0.50 | 0.50 | 0.50 | 0.50 | 0.50 | 0.40 | 0.40 | 0.40 | 0.40 | 0.40 | 0.40 | 0.40 | 0.50 | 0.50 |
| β-OH value [/mm] | | 0.12 | 0.13 | 0.15 | 0.10 | 0.12 | 0.18 | 0.18 | 0.13 | 0.13 | 0.11 | 0.10 | 0.17 | 0.15 | 0.12 | 0.11 | 0.36 |
| Thermal shrinkage value [ppm] | | 10 | 14 | Not measured | Not measured | Not measured | Not measured | Not measured | Not measured | 13 | Not measured | Not measured | Not measured | Not measured | Not measured | Not measured | 17 |
| CTE [× $10^{-7}$/° C.] | | Not measured | Not measured | Not measured | Not measured | Not measured | Not measured | Not measured | 42 | 43 | 41 | Not measured | Not measured | 44 | Not measured | 40 | Not measured |
| Ps [° C.] | | 760 | 740 | 750 | 760 | 740 | 740 | 750 | 750 | 750 | 750 | 760 | 760 | 760 | 770 | 700 | 730 |
| Ta [° C.] | | 810 | 800 | 810 | 810 | 800 | 800 | 810 | 810 | 810 | 810 | 820 | 810 | 810 | 820 | Not measured | Not measured |
| Ts [° C.] | | 1,060 | 1,040 | 1,050 | 1,060 | 1,050 | 1,050 | 1,050 | 1,050 | 1,040 | 1,050 | 1,070 | 1,070 | 1,050 | 1,060 | Not measured | Not measured |
| Temperature at $10^{4.0}$ poise [° C.] | | 1,400 | 1,370 | 1,390 | 1,400 | 1,390 | 1,380 | 1,390 | 1,380 | 1,370 | 1,390 | 1,420 | 1,420 | 1,380 | 1,410 | Not measured | Not measured |
| Temperature at $10^{3.0}$ poise [° C.] | | 1,570 | 1,550 | 1,560 | 1,570 | 1,560 | 1,550 | 1,560 | 1,550 | 1,540 | 1,570 | 1,590 | 1,590 | 1,550 | 1,590 | Not measured | Not measured |
| Temperature at $10^{2.5}$ poise [° C.] | | 1,680 | 1,670 | 1,670 | 1,680 | 1,670 | 1,650 | 1,670 | 1,660 | 1,650 | 1,680 | 1,710 | 1,710 | 1,670 | 1,710 | Not measured | Not measured |
| TL [° C.] | | 1,240 | 1,200 | 1,220 | 1,240 | 1,190 | 1,220 | 1,200 | 1,210 | 1,210 | 1,220 | 1,260 | 1,240 | 1,220 | 1,250 | Not measured | 1,220 |
| LogηTL [poise] | | 5.3 | 5.5 | 5.4 | 5.3 | 5.8 | 5.3 | 5.7 | 5.4 | 5.5 | 5.4 | 5.3 | 5.4 | 5.4 | 5.3 | Not measured | 5.3 |

TABLE 2

| | | No. 17 | No. 18 | No. 19 | No. 20 | No. 21 | No. 22 |
|---|---|---|---|---|---|---|---|
| Glass composition [mol %] | $SiO_2$ | 68.5 | 68.0 | 67.6 | 70.0 | 69.0 | 67.2 |
| | $Al_2O_3$ | 14.6 | 13.6 | 14.1 | 13.0 | 12.5 | 14.9 |
| | $B_2O_3$ | 0.3 | 0.0 | 1.0 | 0.0 | 0.0 | 0.0 |
| | $Na_2O$ | 0.00 | 0.00 | 0.00 | 0.00 | 0.00 | 0.00 |
| | $K_2O$ | 0.00 | 0.00 | 0.00 | 0.00 | 0.00 | 0.00 |
| | MgO | 4.2 | 4.7 | 5.0 | 6.0 | 3.1 | 2.9 |
| | CaO | 7.6 | 8.3 | 7.3 | 6.0 | 7.9 | 8.0 |
| | SrO | 0.5 | 0.1 | 1.0 | 1.0 | 2.1 | 0.0 |
| | BaO | 3.3 | 3.7 | 2.5 | 3.9 | 3.1 | 4.1 |
| | $P_2O_5$ | 0.9 | 1.5 | 1.4 | 0.0 | 2.2 | 2.8 |
| | $Fe_2O_3$ | 0.00 | 0.00 | 0.00 | 0.00 | 0.00 | 0.00 |
| | $SnO_2$ | 0.1 | 0.1 | 0.1 | 0.1 | 0.1 | 0.1 |
| | $SO_3$ | 0.0 | 0.0 | 0.0 | 0.0 | 0.0 | 0.0 |
| | Cl | 0.0 | 0.0 | 0.0 | 0.0 | 0.0 | 0.0 |
| Heating method | | Current application | Current application | Current application | Current application | Current application | Current application |
| Thickness [mm] | | 0.40 | 0.40 | 0.50 | 0.40 | 0.40 | 0.40 |
| β-OH value [/mm] | | 0.08 | 0.09 | 0.19 | 0.13 | 0.15 | 0.11 |
| Thermal shrinkage value [ppm] | | 11 | 12 | Not measured | Not measured | Not measured | 8 |
| CTE [× $10^{-7}$/° C.] | | 39 | 40 | 39 | 40 | 41 | 39 |
| Ps [° C.] | | 760 | 750 | 740 | 760 | 750 | 770 |
| Ta [° C.] | | 820 | 810 | 810 | 810 | 810 | 830 |
| Ts [° C.] | | 1,050 | 1,040 | 1,040 | 1,050 | 1,050 | 1,060 |
| Temperature at $10^{4.0}$ poise [° C.] | | 1,360 | 1,350 | 1,340 | 1,360 | 1,370 | 1,380 |
| Temperature at $10^{3.0}$ poise [° C.] | | 1,520 | 1,510 | 1,500 | 1,520 | 1,540 | 1,530 |
| Temperature at $10^{2.5}$ poise [° C.] | | 1,610 | 1,610 | 1,600 | 1,620 | 1,640 | 1,630 |
| TL [° C.] | | Not measured | Not measured | Not measured | Not measured | Not measured | Not measured |
| LogηTL [poise] | | Not measured | Not measured | Not measured | Not measured | Not measured | Not measured |

First, a glass batch blended so as to achieve a glass composition shown in the tables was loaded in a small test melting furnace formed of zirconia electrocast bricks, and then melted at from 1,600° C. to 1,650° C. by heating through application of a current with a heating electrode (Mo electrode) without heating with combustion burner flame. Thus, molten glass was obtained. For Sample No. 16, the glass batch was melted by heating with combustion oxygen burner flame and heating through application of a current with a heating electrode in combination. Subsequently, the molten glass was fined through use of a Pt—Rh vessel, stirred, and then supplied to a zircon forming body and formed into a flat sheet shape having a thickness shown in the tables by an overflow down-draw method. The resultant glass substrate was evaluated for a β-OH value, an average thermal expansion coefficient CTE within a temperature range of from 30° C. to 380° C., a strain point Ps, an annealing point Ta, a softening point Ts, a temperature at a viscosity of $10^{4.0}$ poise, a temperature at a viscosity of $10^{3.0}$ poise, a temperature at a viscosity of $10^{2.5}$ poise, a liquidus temperature TL, and a viscosity at a liquidus temperature log ηTL.

The β-OH value is a value calculated from the above-mentioned equation 1 with an FT-IR.

The average thermal expansion coefficient CTE within a temperature range of from 30° C. to 380° C. is a value measured with a dilatometer.

The strain point Ps, the annealing point Ta, and the softening point Ts are values measured in accordance with methods specified in ASTM C336 and ASTM C338.

The temperatures at viscosities of $10^{4.0}$ poise, $10^{3.0}$ poise, and $10^{2.5}$ poise are values measured by a platinum sphere pull up method.

The liquidus temperature TL is a value obtained by measuring a temperature at which a crystal precipitates when glass powder which has passed through a standard 30-mesh sieve (500 μm) and remained on a 50-mesh sieve (300 μm) is placed in a platinum boat and kept for 24 hours in a gradient heating furnace. In addition, the viscosity at a liquidus temperature log ηTL is a value measured by a platinum sphere pull up method.

A thermal shrinkage value was measured as described below. First, the glass substrate was marked with two linear marks parallel to each other, and then divided into two glass pieces in the direction perpendicular to the marks. Next, the temperature of one of the glass pieces was increased from normal temperature up to 500° C. at a temperature increase rate of 5° C./min, kept at 500° C. for 1 hour, and then cooled down to normal temperature at a temperature decrease rate of 5° C./min. Subsequently, the glass piece having been subjected to the heat treatment and another glass piece not having been subjected to the heat treatment were arranged next to each other so that their divided surfaces met each other, and were fixed with an adhesive tape. After that, a shift amount ΔL between the marks was measured. Finally, the value $ΔL/L_0$ was determined and used as the thermal shrinkage value. The $L_0$ is the length of the glass piece before the heat treatment.

As is apparent from Tables 1 and 2, Sample Nos. 1 to 14 and 17 to 22 each had a desired glass composition, had a low β-OH value and thus a high strain point, and had a low liquidus temperature and thus high devitrification resistance. Meanwhile, Sample No. 15 had a low strain point because the content of $B_2O_3$ was large. Sample No. 16 had a higher β-OH value than Sample No. 6, and hence had a lower strain point than Sample No. 6.

INDUSTRIAL APPLICABILITY

Other than as a glass substrate for a flat panel display, such as a liquid crystal display or an OLED display, the alkali-free glass substrate of the present invention is suitable, for example, as a cover glass for an image sensor, such as a charge coupled device (CCD) or a contact image sensor (CIS), a glass substrate or a cover glass for a solar cell, or a glass substrate for an OLED lighting device.

The invention claimed is:

1. A glass substrate, comprising as a glass composition, in terms of mol %, 60% to 80% of $SiO_2$, 8% to 25% of $Al_2O_3$, 0% to less than 1% of $B_2O_3$, 0.01% to less than 1% of $Li_2O+Na_2O+K_2O$, 0% to 10% of MgO, 1% to 15% of CaO, 0.001% to less than 1% of $Fe_2O_3$, 0% to 12% of SrO, 2% to 12% of BaO, 0% to less than 0.05% of $As_2O_3$, and 0% to less than 0.05% of $Sb_2O_3$, and having a thickness of from 0.05 mm to 0.7 mm, a strain point of 700° C. or more, a temperature at a viscosity of $10^{2.5}$ poise of 1,650° C. or less, and a β-OH value of less than 0.20/mm.

2. The glass substrate according to claim 1, comprising as a glass composition, in terms of mol %, 65% to 78% of $SiO_2$, 8% to 20% of $Al_2O_3$, 0% to less than 1% of $B_2O_3$, 0.01% to less than 0.5% of $Li_2O+Na_2O+K_2O$, 0% to 8% of MgO, 1% to 8% of CaO, 0.001% to less than 1% of $Fe_2O_3$, 0% to 8% of SrO, 2% to 8% of BaO, 0% to less than 0.01% of $As_2O_3$, and 0% to less than 0.01% of $Sb_2O_3$, and having a thickness of from 0.1 mm to 0.5 mm, a strain point of 730° C. or more, and a β-OH value of less than 0.15/mm.

3. The glass substrate according to claim 1, wherein the glass substrate has a content of $B_2O_3$ of less than 0.1 mol %.

4. The glass substrate according to claim 1, wherein the glass substrate has a content of $B_2O_3$ of from 0.1 mol % to less than 1 mol %.

5. The glass substrate according to claim 1, further comprising as a glass composition 0.001 mol % to 1 mol % of $SnO_2$.

6. The glass substrate according to claim 1, further comprising as a glass composition 0.001 mol % to 1 mol % of Cl and 0.0001 mol % to 1 mol % of $SO_3$.

7. The glass substrate according to claim 1, wherein the glass substrate has a liquidus temperature of 1,300° C. or less.

8. The glass substrate according to claim 1, wherein the glass substrate has a temperature at a viscosity of $10^{2.5}$ dPa·s of 1,750° C. or less.

9. The glass substrate according to claim 1, wherein the glass substrate has a thermal shrinkage value of 20 ppm or less when a temperature of the glass substrate is increased from normal temperature up to 500° C. at a temperature increase rate of 5° C./min, kept at 500° C. for 1 hour, and then cooled down to normal temperature at a temperature decrease rate of 5° C./min.

10. The glass substrate according to claim 1, wherein the glass substrate is used as a substrate of an OLED device.

\* \* \* \* \*